Feb. 5, 1957  M. L. BEYER  2,780,300
REMOTE VARIABLE CONTROL OF VEHICLE SPEED
Filed Aug. 9, 1955  3 Sheets-Sheet 1

INVENTOR:
MILLARD L. BEYER.
BY
ATTORNEY.

INVENTOR:
MILLARD L. BEYER.
BY
ATTORNEY.

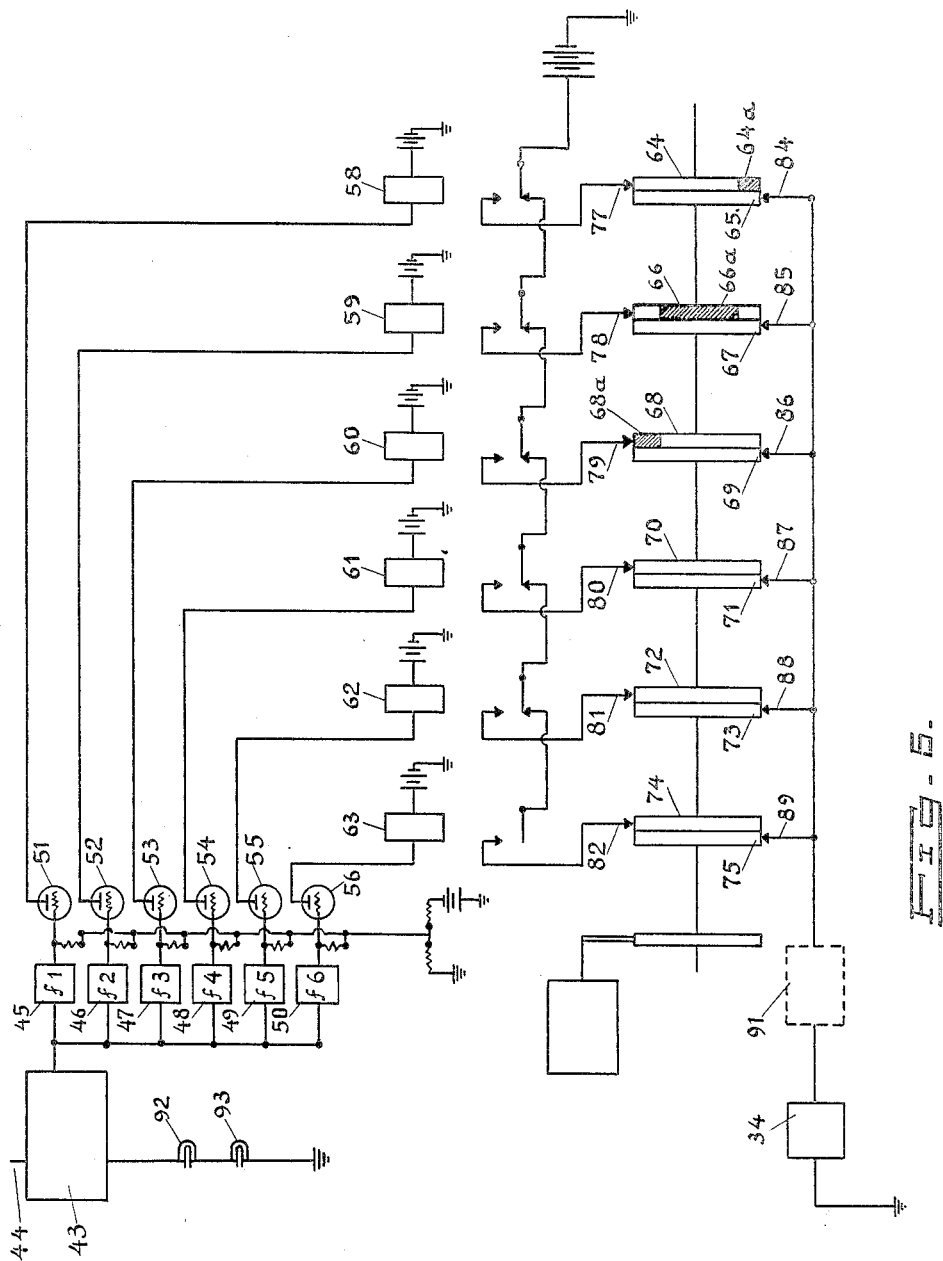

United States Patent Office 2,780,300
Patented Feb. 5, 1957

2,780,300

REMOTE VARIABLE CONTROL OF VEHICLE SPEED

Millard L. Beyer, Hempstead, N. Y.

Application August 9, 1955, Serial No. 527,267

6 Claims. (Cl. 180—82.1)

This invention relates to speed control apparatus for vehicles, particularly automobiles, and has for its principal object to provide an apparatus for automatically limiting the speed of a vehicle by means of signals received from remote sources.

Another object of the invention is to provide a speed governor for automobiles which may be sealed by the state authority, so that it cannot be tampered with by the owner of the vehicle.

Another object of the invention is to provide a speed governor for a vehicle which will have a plurality of different upper speed limits responsive respectively to different signals transmitted in respective zones through which the vehicle passes, so that when the vehicle is passing through a particular zone, the upper speed of the vehicle is automatically limited to the speed assigned to be a safe speed for that zone.

Another object of the invention is to provide a multiple speed governor for a vehicle in which the several speeds are selected by a stepped cam which is caused to rotate to a particular angular position by a received radio signal.

Other objects of the invention will be apparent as the description of the invention proceeds.

The invention is illustrated in the accompanying drawings in which:

Figure 5 is a schematic circuit diagram of the electrical connections.

In general the invention comprises equipment for automatically regulating the speed of vehicles, such as automobiles, moving along the highways or streets, under the control of a central control station or of fixed stations located in zones where reduced speed is desirable, such as at intersections, railroad crossings, school zones, or sections subject to traffic congestion or hazardous driving. The equipment comprises governors which are applied to the engines of such vehicles, and are controlled by radio signals which are radiated from individual transmitters located in different zones or sections of road or street or in police squad cars with the transmitters of a given region all under control of a central station, for example, police headquarters.

Each vehicle is provided with a radio receiver associated with its speed governor, the receiver and governor being contained in a unitary housing which can be sealed by the state authority, so as to render it tamper-proof.

Figure 1:
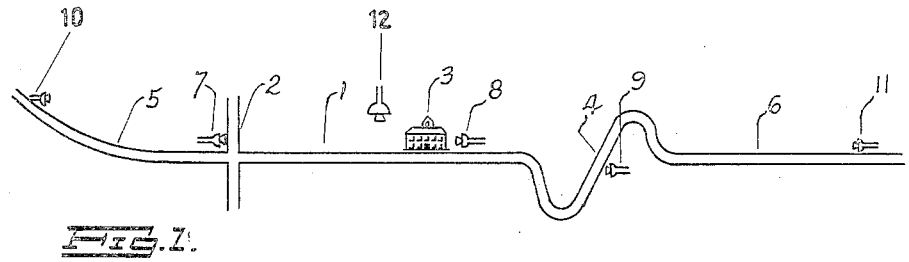
Figure 1 is a plan view of a section of highway used to illustrate the invention.

For purposes of illustration a system has been shown utilizing six different radio signals, each signal representing a different speed for a different section or condition of the highway. In Figure 1 a plan view of a highway 1 is shown with an intersection 2, a school 3, a curving section 4, and relatively straight sections 5 and 6. In accordance with the invention radio transmitters are set upon poles along the highway. At the intersection 2 a transmitter 7 is arranged to radiate a signal over an area sufficient to be received a distance of perhaps a hundred and fifty to two hundrred feet either side of the intersection. Adjacent the school 3 a transmitter 8 is arranged to radiate a signal over an area sufficient to be received a distance of several hundred yards in each direction from the school. At the curving section 4 a transmitter 9 is arranged to radiate a signal over an area sufficient to encompass the curving section of the road. In the same manner the relatively straight sections of the road are provided with transmitters 10 and 11 adapted to radiate signals over areas sufficient to be received by the vehicle radio receivers on these sections of the road.

Any carrier frequency may be used for the purpose of the signals, though frequencies in the short wave band may be preferred, such as in the five meter band. The several signals necessary for providing the corresponding number of speed limits may be produced by separate carrier frequencies, or a single carrier frequency may be used modulated by different lower frequencies representing the different speed limits. In other words, each transmitter controlling a particular speed limit may operate at a particular carrier frequency, or each transmitter may operate at the same carrier frequency which is modulated with a particular lower frequency corresponding to the speed limit which is to be maintained in that zone.

In addition to the zone transmitters, indicated at 7, 8, 9, 10 and 11 (and of course any number of these transmitters may be provided, as is deemed necessary), a main transmitter 12 may be provided which has a strong enough signal to cover all of the zones of the immediate area, so that it can assume control under emergency conditions, as for example, in the case of an ice storm where all sections of the road become hazardous at the same time.

Figure 2:
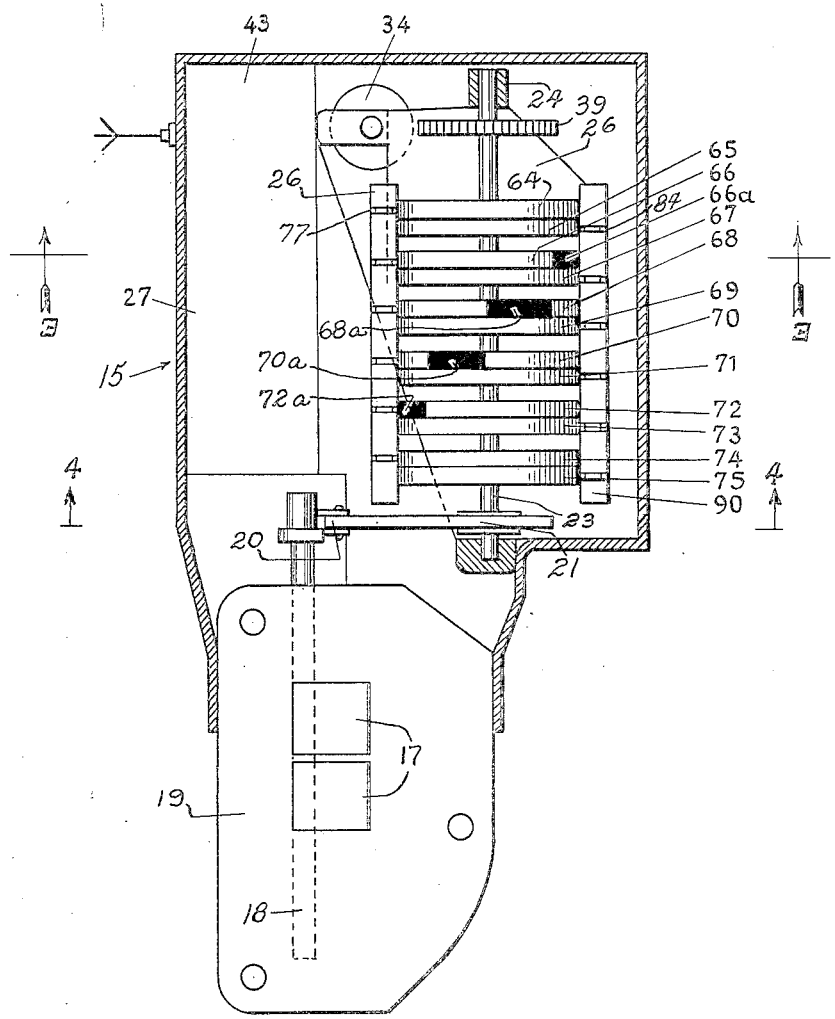
Figure 2 is a sectional plan view of one form of governor together with the control apparatus therefor.
Figure 3:
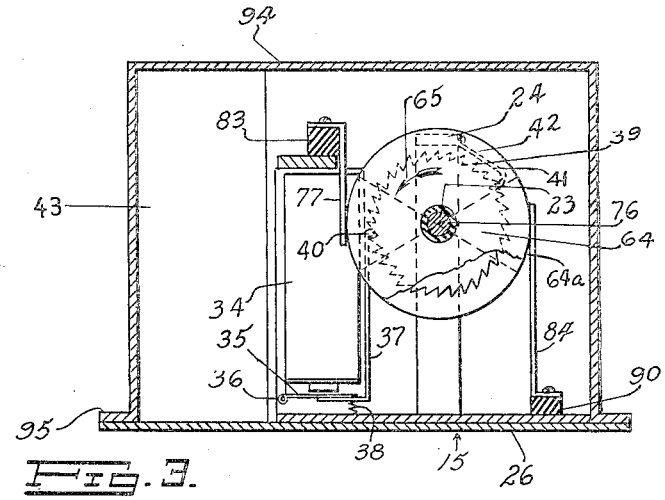
Figure 3 is a sectional, elevational view of the apparatus of Figure 2, taken on the line 3—3 of that figure.
Figure 4:
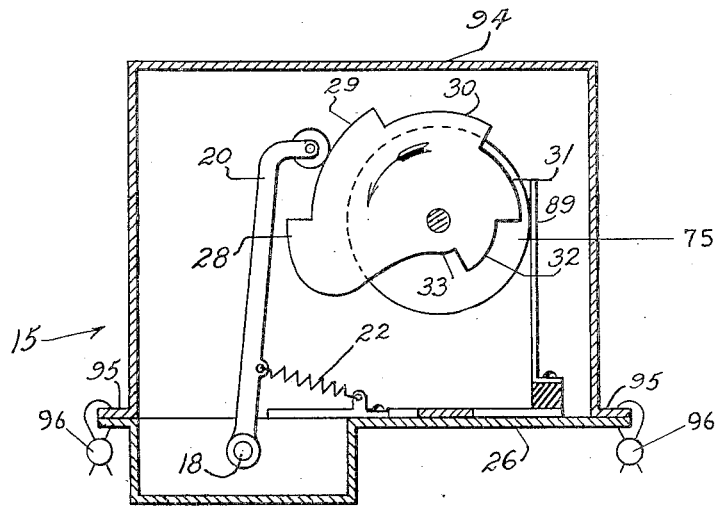
Figure 4 is a sectional, elevational view of the apparatus of Figure 2, taken on the line 4—4 of that figure.

Referring now to Figures 2, 3, and 4, a governor 15 for a vehicle engine has been shown as a well-known type of governor for the usual automobile internal combustion engine comprising butterfly valves 17 attached to a shaft 18 journaled in a casting 19 which is connected in the air inlet of the engine leading to the carbureter. When the valves 17 are set at a predetermined position, the speed of the engine is limited by the amount of air which can be drawn into the carbureter.

The shaft 18 has a cam follower arm 20 attached to one end thereof and the other end of this arm is urged against a stepped cam 21 by means of a spring 22. The cam 21 is mounted on a shaft 23 which is journaled in the ends of arms 24 and 25 of a bracket 26 mounted in a housing 27 rigidly secured to the casting 19.

The cam 21 is provided with six cam positions 28, 29, 30, 31, 32, and 33, each of which holds the cam follower arm 20, and thus the governor shaft 18, in a particular position to provide a speed limitation for a corresponding speed zone. Between the innermost position 33, and the outermost position 28, the cam surface changes radius gradually to provide a smooth movement of the follower arm from the innermost to the outermost positions.

The cam shaft 23 may be rotated in a counterclockwise direction, as viewed from Figures 3 and 4 by a suitable ratchet and pawl mechanism mounted on the bracket 26 and comprising a magnet 34 having an armature 35 pivoted at 36 and having a flat spring extension 37. The armature and extension are held in their unoperated position by means of a spring 38. A ratchet wheel 39 is mounted on one end of the shaft 23 and the teeth thereof are engaged by a pawl 40 mounted on the end of the extension 37. Each operation of the armature 35 and extension 37 by the energization of the magnet 17 causes the pawl 40 to engage the next tooth of the ratchet wheel, and the spring 38 moves the ratchet wheel an angular distance of one tooth in a counterclockwise direction in a well-known manner when the magnet is deenergized. Another pawl 41 at the end of a flat spring 42 mounted on the arm 24 of the bracket 26 also engages the ratchet wheel 39 and prevents the wheel and shaft from moving in a reverse direction when the armature moves to engage a tooth. The number of these steps required to move the cam until the follower arm 20 snaps into the next cam position is immaterial, as will be explained later. The apparatus for controlling the movement of the cam into a selected position will now be described.

In order to rotate the cam shaft 23 to the proper position for controlling the speed of the vehicle in any particular zone, the receiver in the vehicle must be able to differentiate between the signals produced by the different transmitters. For this purpose each vehicle is provided with a radio receiver 43 fed from an antenna 44 mounted in a suitable place on the vehicle. The receiver is preferably mounted inside the housing 27 and has a plurality of filters 45, 46, 47, 48, 49, and 50 associated with it. If the system makes use of different carrier frequencies, the filters are designed to separate these different frequencies, so that a filter will have an output only when its particular carrier frequency is received. If a single carrier frequency is used, the filters are designed to respond to particular modulated frequencies, so that the result is the same in either case: a filter produces a response only when its particular signal is received.

The outputs of the filters are applied respectively to the control grid circuits of amplifier tubes 51, 52, 53, 54, 55, and 56. These grid circuits are biased to a particular value by means of the potentiometer 57, and this bias value is selected so that a signal of a predetermined strength must be received before the associated tube will carry plate current. The reason for this is that the radiating fields of the various transmitters will overlap, the signal from the transmitter in the zone where the vehicle is at any given moment being strong enough to overcome the bias on the grid of the tube associated with the filter receiving the signal, while signals from other transmitters will be too weak.

The plate circuits of the tubes 51 to 56 include, respectively, the windings of sensitive relays 58, 59, 60, 61, 62, and 63. Thus when one of the filters produces a signal strong enough to overcome the bias on the grid of its associated tube, plate current will flow in the tube and the associated relay will operate.

In order to make the cam shaft 23 rotate to a certain position when a particular relay is operated, contacts are provided for each relay and a commutator is provided on the cam shaft arranged in such a manner that a circuit is completed for the driving magnet 34 which is broken when the shaft reaches the proper position. To this end each of the relays has an armature with a make contact, while relays 58 to 62 have in addition a break contact. The commutator comprises a plurality of discs mounted on the shaft 23, there being two for each relay. These discs are indicated at 64, 65, 66, 67, 68, 69, 70, 71, 72, 73, 74, 75. They are mounted upon an insulating sleeve 76 and each pair is spaced from the pairs next adjacent to it, so that each pair of discs is insulated from the shaft and from every other pair. One disc of each pair, for example the one with the even numbered reference character, is provided with an insulating segment having an angle of 60°. These segments have been identified in Figures 2, 3, and 5 by the reference character of the disc followed by the letter "a." Wiper brushes 77, 78, 79, 80, 81, and 82 are arranged to make contact with the edges of discs 64, 66, 68, 70, 72, and 74. These brushes may be flat springs attached at one end to an insulating block 83 mounted on the bracket 26. Each of the brushes 77 to 82 is connected to the make contact of a corresponding one of the relays 58 to 63, as is indicated in Figure 5.

A second set of brushes 84, 85, 86, 87, 88, and 89 is mounted on an insulating block 90 attached to the bracket 26. The brushes of this set are arranged to make contact with discs 65, 67, 69, 71, 73, and 75, respectively. They are all connected together and to one terminal of the driving magnet 34, the other terminal of which is connected to ground.

The break contact of each of the relays 58 to 62 is connected to the armature of the next succeeding relay, while the armature of the relay 58 is connected to grounded battery. This makes a chain of contacts leading from each armature to battery which will open and break the circuit if any preceding relay operates. The purpose of this arrangement is to cause the relay representing the lowest speed to control if more than one relay operates at a time. The relay 58 is assumed to control the lowest speed and the relay 63 the highest. If, for example, relays 61 and 59 were to operate simultaneously, the circuit for the driving magnet 34 through the commutator disc 70 would be broken at the break contact of relay 59, while the circuit through the commutator disc 66 would be closed through the make contact of relay 59. Thus the cam shaft would be controlled by the relay 59 and not by the relay 61.

Since the shaft is turned in steps by the successive operation of the driving magnet 34, it is necessary to produce a succession of pulses at the driving magnet. This may be accomplished, of course, by transmitting the signal from the transmitters in pulses in a well-known manner. However, if the signal were to be made continuous, pulses could still be produced at the driving magnet by means of an interrupting device 91 connected in the circuit thereof. This may be a break contact opened whenever the magnet operates.

In the operation of the invention, assume that a vehicle equipped with the necessary receiver is travelling along the highway 1 of Figure 1 from left to right and is in the zone where it receives the signal from the transmitter 10. This is a high speed zone and the signal picked up by the receiver 43 will produce a response from the high speed filter 50 which responds to the frequency $f6$. The tube 56 will draw plate current and the relay 63 will operate. If no other relays are operated, a circuit will be closed from grounded battery, through the chain of break contacts, make contact of the relay 63, commutator disc 74 (if the cam shaft is not already in the high speed position), commutator disc 75, interrupting device 91, drive magnet 34, to ground. The drive magnet will then operate intermittently under control of the interrupting device until the insulating segment 74a appears under the brush 82. At this instant the circuit is broken and the cam shaft 23 stops. The insulating segment is of course positioned at such an angle that it will be under the brush when the cam shaft is in the high speed position.

The vehicle will continue limited in speed only by the high speed control until it approaches the region of the intersection 2. Here the signal from the transmitter 7 becomes strong enough to take over. Assume that this signal produces a response in the filter 48 by means of frequency $f4$, which may represent a speed of 25 miles an hour. The circuit for the driving magnet 34 will now be through the commutator disc 70 and the driving magnet will begin to step the shaft around until the segment 70a breaks the circuit, whereupon the shaft will stop with the governor shaft 13 in position to limit the speed of the vehicle to 25 miles per hour. After the intersection is crossed, the vehicle will leave the influence of the transmitter 7 and enter into the zone controlled by the transmitter 8 adjacent the school 3. Here it may be assumed that the speed is to be reduced to 15 miles an hour. The signal will produce a response from filter 45 and cause the tube 51 to operate, thus in turn operating the relay 58. The circuit for driving the magnet 34 is then completed through the commutator disc 64, and the cam shaft 23 is rotated to the low speed position. In a similar manner each transmitter will control the limit of speed in its particular zone.

If at any time the central transmitter 12 transmits a strong signal for limiting the speed along the entire highway, this signal will operate its associated relay and will move the cam shaft of the vehicle to a position corresponding to that speed as long as one of the other transmitters is not controlling it at a lower speed, for in that case the chain circuit would be open and the higher speed relay could not affect the cam shaft.

It is desirable for the driver of the vehicle to know whether or not the control system in his vehicle is working. Therefore I provide a light 92 on the instrument panel which is controlled by a switch in the radio receiver 43, the arrangement being such that the light is on when the receiver is working. Similarly, a light 93 at the rear of the vehicle may be provided to appraise the driver of a following vehicle that the controls are operating in the vehicle ahead.

Since it is desirable to have all vehicles on the highway under the control of the police authority, the invention provides that the governor, the receiver, and the control apparatus can be sealed by the state authority so that it cannot be tampered with by the owner of the vehicle. To this end all of the apparatus is contained in the housing 27, which may have a cover 94 attachable in any suitable manner to it. Flanges 95 have been shown for this purpose and seals 96 have been shown which may be applied when the apparatus is adjusted to respond to the signals.

Many modifications may be made in the apparatus shown and described and I do not wish to limit myself except by the limitations contained in the appended claims.

What is claimed is:

1. A speed control apparatus for a vehicle comprising a radio receiver, a unitary housing adapted to be positioned adjacent the engine of said vehicle and adapted to be sealed in closed condition, a speed governor in said housing and connected to said engine to control the speed thereof, cam means in said housing for adjusting the speed limit of said governor, driving means for said cam means, means for stopping said driving means at predetermined angular positions of said cam means, and means in said housing connected to said radio receiver and responsive to different signals received thereby for operating said stopping means so as to stop said cam means at respective different angular positions thereof.

2. A speed control apparatus for a vehicle, as defined in claim 1, in which the cam means comprises a shaft and a cam on said shaft, and the means for stopping the drive means comprises a plurality of commutator discs on said shaft, there being one for each angular position at which it is desired to stop said cam means, each of said discs having an insulating segment at a different angular position corresponding to one of said stopping positions and a wiper contacting the edge of said disc, the signal responsive means connected to the radio receiver comprising selective means for separating signals received by said receiver, and circuits respectively connecting said selective means and the drive means for said cam means and including respective commutator discs and their wipers.

3. A speed control apparatus for a vehicle, as defined in claim 2, in which the cam is a stepped cam and the cam means includes a cam follower riding on said cam and means for changing the speed limit of said governor by movement of said cam follower.

4. A speed control apparatus for a vehicle, as defined in claim 2, in which the selective means for separating signals received comprises a plurality of filters each responsive to a different frequency, and a relay for each filter connected to the output thereof and adapted to operate when the filter responds to a received frequency, the circuits respectively connecting said selective means and the drive means including contacts of said relays.

5. A speed control apparatus for a vehicle comprising a radio receiver for receiving radio waves of different frequencies, a plurality of filter means connected to said receiver for separating received waves of the different frequencies, a switch device comprising a shaft, cam means mounted on said shaft, means for driving said shaft, electrical control means for said driving means, and a plurality of commutator discs mounted on said shaft, each of said discs having an insulator segment corresponding to a predetermined different angular position of said cam means, there being one such disc for each radio wave frequency, a plurality of switch means connected respectively to said filter means and responsive respectively to the operation thereof, a circuit for each switch means adapted to be completed by said switch means and including the corresponding commutator disc and said electrical control means for said driving means, speed governor means controlled by said cam means, and means connecting said cam means with said speed governor means so as to provide different speed limits for said governor means for respective different ones of said predetermined angular positions of said cam means, whereby said speed governor is maintained at a particular speed limit as determined by a received radio wave.

6. A speed control apparatus for a vehicle, as defined in claim 5, further comprising a housing for the switch device and speed governor means, and means for sealing said housing in closed condition so that the adjustment of said speed governor means cannot be altered.

References Cited in the file of this patent

UNITED STATES PATENTS

| | | |
|---|---|---|
| 761,876 | Clark | June 7, 1904 |
| 844,074 | Woodward | Feb. 12, 1907 |
| 1,453,368 | Teves | May 1, 1923 |
| 2,656,002 | Keeton et al. | Oct. 20, 1953 |